United States Patent
Al-rfou' et al.

(10) Patent No.: US 11,455,512 B1
(45) Date of Patent: Sep. 27, 2022

(54) REPRESENTING GRAPH EDGES USING NEURAL NETWORKS

(71) Applicant: Google LLC, Mountain View, CA (US)

(72) Inventors: Rami Al-rfou', Mountain View, CA (US); Sami Ahmad Abu-El-Haija, San Francisco, CA (US); Bryan Thomas Perozzi, Cranford, NJ (US)

(73) Assignee: Google LLC, Mountain View, CA (US)

( * ) Notice: Subject to any disclaimer, the term of this patent is extended or adjusted under 35 U.S.C. 154(b) by 1126 days.

(21) Appl. No.: 15/946,301

(22) Filed: Apr. 5, 2018

Related U.S. Application Data

(60) Provisional application No. 62/482,093, filed on Apr. 5, 2017.

(51) Int. Cl.
| | | |
|---|---|---|
| *G06N 3/04* | (2006.01) | |
| *G06N 3/08* | (2006.01) | |
| *G06F 16/901* | (2019.01) | |

(52) U.S. Cl.
CPC ............ *G06N 3/04* (2013.01); *G06F 16/9024* (2019.01); *G06N 3/08* (2013.01)

(58) Field of Classification Search
CPC ......... G06N 3/04; G06N 3/08; G06F 16/9024
See application file for complete search history.

(56) References Cited

PUBLICATIONS

Socher, R., Chen, D., Manning, C.D. and Ng, A., 2013. Reasoning with neural tensor networks for knowledge base completion. In Advances in neural information processing systems (pp. 926-934). (Year: 2013).*

Abadi et al."TensorFlow: Large-Scale machine Learning on Heterogeneous Systems," OSDI vol. 16, Nov. 2016, 20 pages.

Abu-El-Haija et al. "Learning Edge Representations via Low-Rank Asymmetric Projections," Proceedings of the 34th International Conference on Machine Learning, Nov. 2017, 10 pages.

Abu-El-Haija et al. "Proportionate gradient updates with percent Delta," arXiv1708.07227v1, Aug. 24, 2017, 8 pages.

Atwood et al. "Diffusion-Convolutional Neural Networks," NIPS, Dec. 2016, 9 pages.

Belkin et al. "Laplacian Eigenmaps and spectral techniques for embedding and clustering," NIPS Dec. 2002, 7 pages.

Bruna et al. "Spectral networks and deep locally connected networks on graphs," International Conference on Learning Representations, arXiv 1312.6203, Dec. 21, 2013, 14 pages.

(Continued)

*Primary Examiner* — Eric Nilsson
(74) *Attorney, Agent, or Firm* — Fish & Richardson P.C.

(57) ABSTRACT

Methods, systems, and apparatus, including computer programs encoded on a computer storage medium, for a graph processing system. In one aspect, the graph processing system obtains data identifying a first node and a second node from a graph of nodes and edges. The system processes numeric embeddings of the first node and the second node using a manifold neural network to generate respective manifold coordinates of the first node and the second node. The system applies a learned edge function to the manifold coordinates of the first node and the manifold coordinates of the second node to generate an edge score that represents a likelihood that an entity represented by the first node and an entity represented by the second node have a particular relationship.

20 Claims, 4 Drawing Sheets

(56) References Cited

PUBLICATIONS

Cao et al. "Deep Neural networks for learning graph representations," Proceedings of the Association for the Advancement of Artificial Intelligence, Feb. 12, 2016, 8 pages.
Chen et al. "HARP: Hierarchical Representation Learning for Networks," arXiv 1706.07845, Nov. 16, 2017, 8 pages.
Dai et al. "Discriminative Embeddings of Latent Variable Models for Structured Data," International Conference on Machine Learning, Jun. 11, 2016, 10 pages.
Defferrard et al. "Convolutional Neural Networks on Graphs with Fast Localized Spectral Filtering," NIPS, Dec. 2016, 9 pages.
Duvenaud et al. "Convolutional Networks on Graphs for Learning Molecular Fingerprints," NIPS Dec. 2015, 9 pages.
Ganguly et al. "Author2Vec: Learning Author Representations by Combining Content and Link Information," Proceedings of the $25^{th}$ International Conference on World Wide Web, Apr. 2016, 2 pages.
Gori et al. "A new model for learning in graph domains," IEEE International Joint Conference on Neural Networks, Jul. 2005, 6 pages.
Graves et al. "Neural Turing Machines," arXiv 1410.5401, Dec. 10, 2014, 26 pages.
Grover et al. "Node2Vec: Scalable Feature Learning for Networks," Proceedings of the $22^{nd}$ ACM SIGKDD International Conference on Knowledge Discovery and Data Mining, Aug. 2016, 29 pages.
Gutmann et al. "Noise-contrastive estimation of unnormalized statistical models, with applications to natural image statistics," Journal of Machine Learning Research, Feb. 2012, 55 pages.
Hagen et al. "New spectral methods for ratio cut partitioning and clustering," IEEE Transactions on Computer-aided design of integrated circuits and systems, 11(9), Sep. 1992, 12 pages.
Henaff et al. "Deep Convolutional Networks on Graph-Structured Data" arXiv 1506.05163, Jun. 16, 2015, 10 pages.
Ioffe et al. "Batch Normalization: Accelerating Deep Network Training by Reducing Internal Covariate Shift," arXiv 1502.03167,, Feb. 11, 2015, 11 pages.
Kingma et al. "Adam: A method for stochastic optimization" arXiv 1412.6980v9, Jan. 30, 2017, 15 pages.
'snap.stanford.edu' [online] "SNAP Datasets: Stanford large network dataset collection" June Leskovec et al. Jun. 2014, [Aug. 16, 2018] Retrieved from Internet: URL<https://snap.stanford.edu/data/> 5 pages.
Levy et al. "Neural word embedding as implicit matrix factorization," NIPS Dec. 2014, 9 pages.
Li et al. "Gated Graph Sequence Neural Networks," arXiv 1511.05493, Nov. 17, 2015, 20 pages.
Luo et al. "Context-Dependent Knowledge Graph Embedding," Proceedings of the Conference on Empirical Methods in Natural Language Processing, Aug. 2015, 6 pages.
Mikolov et al. "Distributed representations of words and phrases and their compositionality," NIPS Dec. 2013, 9 pages.
Niepert et al. "Learning Convolutional Neural Networks in Graphs," International Conference on Machine Learning, Jun. 11, 2016, 10 pages.
Pan et al. "Tri-Party Deep Networks Representation," Network, 11(9), Jul. 2016, 7 pages.
Pennington et al. "Glove: Global vectors for word representation," Conference on Empirical Methods in natural Language Processing, Oct. 2014, 12 pages.
Perozzi et al. "Don't Walk, Skip! Online Learning of Multi-scale Networks Embedding's," arXiv1605.02115v2, Jun. 24, 2017, 8 pages.
Perozzi et al. "Exact age prediction in social networks," International Conference on World Wide Web, AACM, May 18, 2015, 2 pages.
Perozzi et al."Deepwalk: Online learning of social representations," [Presentation] Proceedings of the $20^{th}$ ACM SIGKDD International Conference On Knowledge Discovery and Data Mining, Aug. 2014, 35 pages.
Perozzi et al. "Deepwalk: Online learning of social representations," [Paper] arXiv 1403.6652v2, Jun. 27, 2014, 10 pages.
Scarselli et al. "The Graph Neural Network Model," IEEE Transactions on Neural Networks, Jan. 2009, 32 pages.
Shi et al. "Normalized cuts and image segmentation," IEEE Transactions on Pattern Analysis and Machine Intelligence, 22(8), Aug. 2000, 20 pages.
Stark et al. "BioGRID: A general Repository for Interactions Datasets," Nucleic Acids Research, Jan. 2006, 5 pages.
Wang et al. "Revisiting semi-supervised learning with graph embeddings," International Conference on Machine Learning, Jun. 2016, 9 pages.
Wang et al. "Structural Deep Network Embedding," International Conference on Knowledge Discovery and Data Mining, Aug. 2016, 10 pages.
Wang et al. "Relational Deep Learning: A deep latent variable model for link prediction," AAAI Feb. 2017, 7 pages.
Yu et al. "Piecewise Flat Embedding for Image Segmentation," IEEE International Conference on Computer Vision, Dec. 2015, 9 pages.

\* cited by examiner

REPRESENTING GRAPH EDGES USING NEURAL NETWORKS

BACKGROUND

This specification relates to processing graphs of nodes and edges using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes a pair of nodes from a graph to determine whether the entities represented by the pair of nodes have a particular relationship.

According to a first aspect there is provided a method that includes obtaining data identifying a first node and a second node from a graph of nodes and edges. The nodes in the graph represent entities, each edge in the graph connects a respective pair of nodes in the graph, and each edge represents a particular relationship between the entities represented by the respective pair of nodes connected by the edge. A numeric embedding of the first node is processed using a manifold neural network to generate manifold coordinates of the first node. The manifold neural network is a deep neural network that is configured to receive input numeric embeddings representing input nodes and to process each input numeric embedding to generate manifold coordinates of the input node represented by the input numeric embedding. A numeric embedding of the second node is also processed using the manifold neural network to generate manifold coordinates of the second node. A learned edge function is applied to the manifold coordinates of the first node and the manifold coordinates of the second node to generate an edge score between the first node and the second node. The edge score represents a likelihood that an entity represented by the first node and an entity represented by the second node have the particular relationship.

In some implementations, the method includes determining, based on the edge score, whether or not to connect the first node and the second node with an edge in the graph.

In some implementations, the particular relationship is an asymmetric relationship, wherein edges in the graph are directed edges, and wherein the learned edge function is an asymmetric edge function.

In some implementations, the edge score represents a likelihood that the entity represented by the first node has the particular relationship to the entity represented by the second node regardless of whether the entity represented by the second node has the particular relationship to the entity represented by the first node.

In some implementations, a dimensionality of the manifold coordinates is smaller than a dimensionality of the numeric embeddings.

In some implementations, the learned edge function and the manifold neural network have been trained jointly to determine trained values of parameters of the learned edge function and the manifold neural network.

In some implementations, the learned edge function is a learned low-rank affine projection of the manifold coordinates for the first node and second node.

In some implementations, the learned edge function is an inner product of (i) a matrix multiplication between a learned left projection matrix and a transpose of the manifold coordinates of the first node and (ii) a matrix multiplication between a learned right projection matrix and the manifold coordinates of the second node.

In some implementations, the learned edge function is an inner product between (i) a learned parameter vector and (ii) a vector that includes, for each dimension of the learned parameter vector, a value of an activation function of a respective learned low-rank affine projection for the dimension.

According to a second aspect there is provided a method of training a manifold neural network and a learned edge function to determine trained values of parameters of the manifold neural network and the learned edge function. The manifold neural network is a deep neural network that is configured to receive input numeric embeddings representing input nodes in a graph and to process each input numeric embedding to generate manifold coordinates of the input node represented by the input numeric embedding. The learned edge function is configured to receive manifold coordinates of a first node in the graph and manifold coordinates of a second node in the graph and to process the manifold coordinates of the first node and the manifold coordinates of the second node to generate an edge score that represents a likelihood that an entity represented by the first node and an entity represented by the second node have a particular relationship.

The method includes obtaining a batch of inputs including data identifying (i) one or more positive nodes for a particular node in the graph and (ii) one or more negative nodes for the particular node. Using the manifold neural network and in accordance with current values of parameters of the manifold neural network, respective manifold coordinates of the particular node, the positive nodes, and the negative nodes are determined. Using the learned edge function and in accordance with current values of parameters of the learned edge function, a respective edge score with the particular node for each of the positive nodes and the negative nodes from the respective manifold coordinates are determined. Gradients of an objective function that promotes generating high edge scores for the positive nodes and penalizes generating high edge scores for the negative nodes with respect to the parameters of the manifold neural network and the parameters of the learned edge function are determined. The gradients are used to update the current values of the parameters of the manifold neural network and of the parameters of the learned edge function.

In some implementations, the method further includes determining a gradient of the objective function with respect to a current numeric embedding of the particular node and updating the current numeric embedding of the particular node using the gradient.

In some implementations, the method further includes determining gradients of the objective function with respect to respective current numeric embeddings of the positive nodes and updating the current numeric embeddings of the positive nodes using the gradients.

In some implementations, each negative node is a node that is not connected by an edge to the particular node in the graph.

In some implementations, each positive node is a node that is within a context window of the particular node in a sequence of nodes generated by a random walk of the graph.

According to a third aspect there is provided a system including one or more computers and one or more storage devices storing instructions that when executed by the one or more computers cause the one or more computers to perform operations including the operations of the previously described methods.

According to a fourth aspect there is provided one or more computer storage media storing instructions that when executed by one or more computers cause the one or more computers to perform the operations including the operations of the previously described methods.

Particular embodiments of the subject matter described in this specification can be implemented so as to realize one or more of the following advantages.

The graph processing system as described in this specification may consume fewer computational resources (e.g., memory and computing power) than conventional systems. For example, the graph processing system as described in this specification learns to represent nodes by manifold coordinates that can, in some cases, have a dimensionality that is substantially smaller than the node embeddings used by conventional systems to represent nodes. Therefore, the graph processing system as described in this specification may consume fewer memory resources than some conventional systems by storing (e.g., in a logical data storage area or physical data storage device) node manifold coordinates rather than the node embeddings stored by some conventional systems. Moreover, the graph processing system as described in this specification may consume less computing power (e.g., by performing fewer arithmetic operations) while performing tasks (e.g., link prediction) than conventional systems performing the same tasks. More specifically, the graph processing system as described in this specification may consume less computing power than some conventional systems since the node manifold coordinates it processes have a smaller dimensionality than the node embeddings processed by some conventional systems, and processing data of a lower dimensionality may consume less computing power.

The graph processing system as described in this specification may achieve improved performance relative to conventional systems in tasks such as link prediction (e.g., predicting whether edges should exist between nodes). For example, the graph processing system as described in this specification can model asymmetric relationships that exist between entities represented by nodes in graphs with directed edges. In contrast, some conventional systems can only model symmetric relationships between entities that are represented by nodes in graphs with undirected edges. These conventional systems may therefore exhibit lower performance than the graph processing system as described in this specification in tasks such as link prediction in graphs with directed edges (e.g., since they are unable to model the asymmetric relationships represented by directed edges). Moreover, even in tasks such as link prediction in graphs with undirected edges, the graph processing system as described in this specification can exhibit superior performance than conventional systems. For example, the graph processing system as described in this specification may generalize beyond training data sets more readily than conventional systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
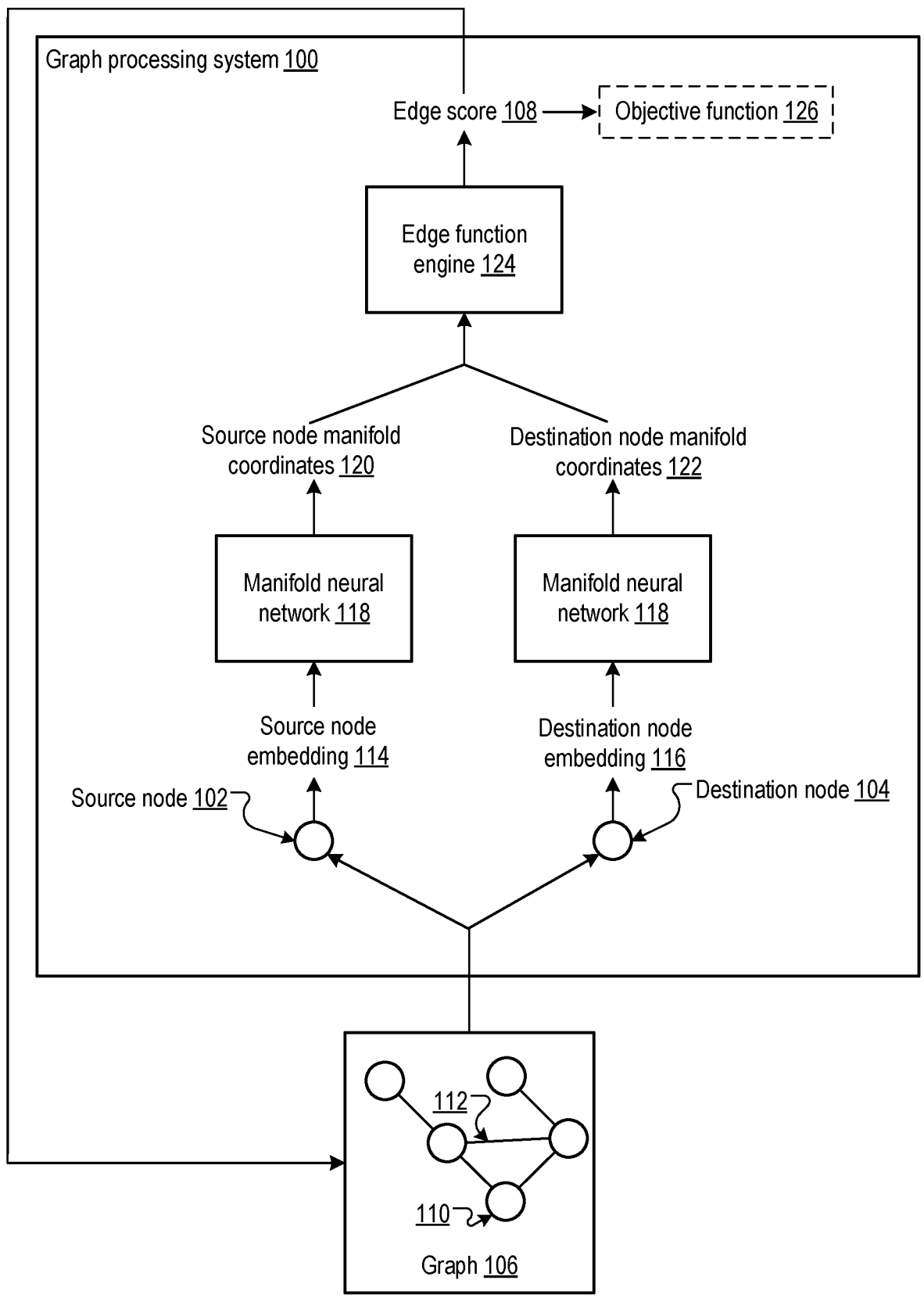
FIG. 1 is an illustration of an example graph processing system.

FIG. 1 shows an example graph processing system 100. The graph processing system 100 is an example of a system implemented as computer programs on one or more computers in one or more locations in which the systems, components, and techniques described below are implemented.

The system 100 processes a pair of nodes (e.g., a source node 102 and a destination node 104) from a graph 106 to determine an edge score 108 for the pair of nodes. The edge score 108 is a numerical value indicating a likelihood that the entities represented by the pair of nodes have a particular relationship.

In general, the graph 106 may be represented by a set of nodes (e.g., the node 110) and a set of edges (e.g., the edge 112). The nodes in the graph 106 represent entities. Each node may be associated with one or more attributes of the entity that it represents. Each edge in the graph is associated with (i.e., "connects") a respective pair of nodes in the graph and represents a particular relationship between the entities represented by the pair of nodes (i.e., indicates that the entities represented by the pair of nodes have the particular relationship). The edges of the graph 106 may be directed edges (i.e., representing asymmetric relationships between entities represented by pairs of nodes) or undirected edges (i.e., representing symmetric relationships between entities represented by pairs of nodes).

Generally, the nodes in the graph 106 can represent various kinds of entities and the edges in the graph 106 can represent any of a variety of relationships between entities represented by pairs of nodes. A few examples follow.

For example, the nodes can represent biological molecules (e.g., proteins), the attributes of the nodes can be characteristics of the biological molecules (e.g., molecular weight, types of bonds, constituent molecules, and the like), and the edges can represent whether two biological molecules interact (e.g., establish specific physical contacts with one another). In this example, an edge score 108 can represent a likelihood that two biological molecules represented by respective nodes will interact.

As another example, the nodes can represent members of a social network, the attributes of the nodes can be data associated with the members of the social network (e.g., location, occupation, age, and the like), and the edges can represent whether two members are connected in the social network. If the social network allows asymmetric connections (e.g., a first user can "follow" a second user without the second user necessarily "following" the first user), the edges in the graph 106 can be directed edges. In this example, an edge score 108 can represent a likelihood that two members represented by respective nodes are connected in the social network or, in the asymmetric case, a likelihood that a member represented by a first node is connected to a member represented by a second node.

As another example, the nodes can represent consumer products available for sale, the attributes of the nodes can be data associated with the products for sale (e.g., price, weight, manufacturer, and the like), and the edges can represent whether two products are related. If the edges represent asymmetric relationships between the products (e.g., whether a second product is frequently purchased given that a first product has previously been purchased), then the edges in the graph 106 can be directed edges. If the edges represent symmetric relationships between the products (e.g., whether a first product and a second product are frequently jointly purchased), then the edges in the graph 106 can be undirected edges. In this example, an edge score 108 can represent a likelihood that two products represented by respective nodes are related.

Once the system 100 has processed the source node 102 and the destination node 104 to generate the edge score 108 for the pair of nodes, the edge score 108 can be used to determine whether the source node 102 and the destination node 104 should be connected by an edge. For example, the system 100 can determine that the source node 102 and the destination node 104 should be connected by an edge if the edge score 108 exceeds a threshold score.

In response to determining that the source node 102 and the destination node 104 should be connected by an edge, the system 100 can, for example, augment the graph 106 by connecting the source node 102 and the destination node 104 by an edge. As another example, the system 100 can provide the edge score as input to another system (e.g., a system that provides recommendations to social network members about which other members to connect with, a system that provides product recommendations, or a system that models molecule interactions).

To generate the edge score 108 for the source node 102 and the destination node 104, the system 100 obtains embeddings of the source node 102 and the destination node 104 (i.e., the source node embedding 114 and the destination node embedding 116). An embedding of a node is a numerical representation of the node in any appropriate format (e.g., as a vector or as a matrix). As will be described in more detail later, the node embeddings are determined during training of the system 100, and may be (in some cases) based on the attributes of the respective nodes.

The system 100 includes a manifold neural network 118 that is configured to receive a node embedding as input, process the node embedding in accordance with current values of manifold neural network parameters, and generate an output referred to as the manifold coordinates of the node represented by the input node embedding. The manifold coordinates generated by the manifold neural network 118 generally have a smaller dimensionality than the node embeddings processed by the manifold neural network 118 (in some cases, by orders of magnitude). That is, the manifold coordinates are compressed representations of the node embeddings received as input by the manifold neural network 118. The manifold neural network 118 can be implemented as a fully-connected neural network, a convolutional neural network, or any other appropriate type of neural network.

The system provides the source node embedding 114 and the destination node embedding 116 as inputs to the manifold neural network 118. The manifold neural network 118 processes the source node embedding 114 and the destination node embedding 116 to generate as output respective source node manifold coordinates 120 and destination node manifold coordinates 122.

The system 100 includes an edge function engine 124 that is configured to receive as input a pair of manifold coordinates of respective nodes, process the pair of manifold coordinates in accordance with current values of edge function engine parameters, and generate as output an edge score for the respective nodes. As described previously, an edge score is a numerical value indicating a likelihood that the entities represented by the respective nodes have a particular relationship. As will be described further with reference to FIG. 2, the edge function engine 124 may generate the edge score 108 as a low-rank affine projection of the manifold coordinates of the respective nodes.

The system provides the source node manifold coordinates 120 and the destination node manifold coordinates 122 as inputs to the edge function engine 124. The edge function engine 124 processes the source node manifold coordinates 120 and the destination node manifold coordinates 122 to generate as output the edge score 108 for the source node 102 and the destination node 104.

When the edges in the graph 106 are directed edges, the edge function engine 124 can be asymmetric with respect to the input pair of manifold coordinates of the respective nodes. More specifically, the edge score generated by the edge function 124 can depend on an ordering of the input pair of manifold coordinates of the respective nodes. For example, if $X_1$ and $X_2$ are the manifold coordinates of the respective nodes, then edge function engine 124 may generate a different edge score for the pair of manifold coordinates $(X_1, X_2)$ than for the pair $(X_2, X_1)$. In this example, the edge score for the pair of manifold coordinates $(X_1, X_2)$ represents a likelihood that the entity represented by the node corresponding to $X_1$ has a particular relationship with the entity represented by the node corresponding to $X_2$, regardless of whether the entity represented by the node corresponding to $X_2$ has the particular relationship with the entity represented by the node corresponding to $X_1$. Analogously, the edge score for the pair of manifold coordinates $(X_2, X_1)$ represents a likelihood that the entity represented by the node corresponding to $X_2$ has a particular relationship with the entity represented by the node corresponding to $X_1$, regardless of whether the entity represented by the node corresponding to $X_1$ has the particular relationship with the entity represented by the node corresponding to $X_2$.

The system 100 jointly trains the edge function engine 124, the manifold neural network 118, and the node embeddings (e.g., the source node embedding 114 and the destination node embedding 116) to determined trained values of their respective parameters. More specifically, the system 100 jointly trains the edge function 124, the manifold neural network 118, and the node embeddings by repeatedly updating their parameter values based on a gradient of an objective function 126. As will be described further with reference to FIG. 3, the objective function may promote generating high edge scores for pairs of nodes that frequently appear in proximity to one another in random walks through the nodes of the graph 106, and penalize high edge scores for pairs of nodes that are not connected by an edge in the graph 106.

Figure 2:
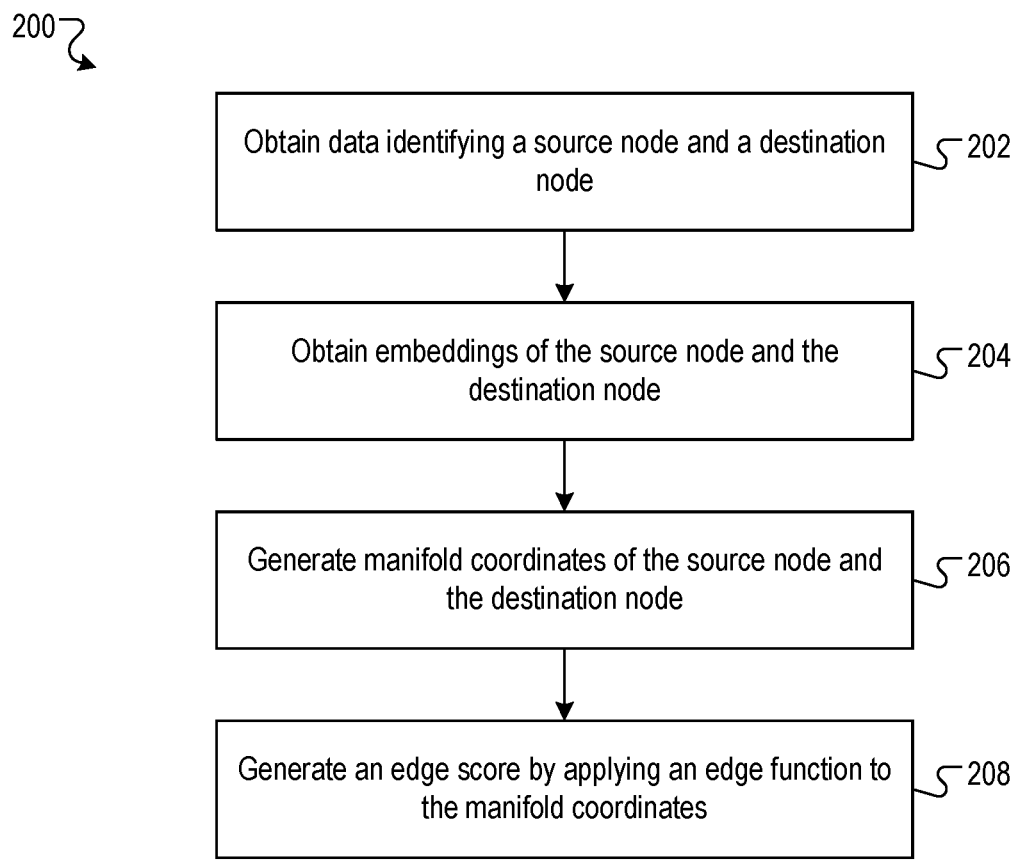
FIG. 2 is a flow diagram of an example process for generating an edge score for a pair of nodes from a graph.

FIG. 2 is a flow diagram of an example process for generating an edge score for a pair of nodes from a graph. For convenience, the process 200 will be described as being performed by a system of one or more computers located in one or more locations. For example, a graph processing system, e.g., the graph processing system 100 of FIG. 1, appropriately programmed in accordance with this specification, can perform the process 200.

The system obtains data identifying a first node (i.e., a source node) and a second node (i.e., a destination node) from a graph (202). For example, the nodes of the graph may be indexed by natural numbers (e.g., 1, 2, 3, etc.), and the system may obtain the index values of the first node and the second node.

The system obtains embeddings of the source node and the destination node (204). An embedding of a node is a numerical representation of the node in any appropriate format (e.g., as a vector or as a matrix). The system determines the node embeddings during a joint training procedure (as described further below with reference to FIG. 3).

For example, the system may maintain data including: (i) the index values of the nodes of the graph, and (ii) the corresponding embeddings of the nodes of the graph (e.g., in a logical data storage area or a physical data storage device). The system may obtain the embeddings of the source node and the destination node by matching the index values identifying the source node and the destination node to index values in the maintained data and obtaining the corresponding node embeddings from the maintained data.

The system generates manifold coordinates of the source and the destination node by providing the source node embedding and the destination node embedding (e.g., as obtained in 204) as inputs to a manifold neural network (206). The manifold neural network processes the source node embedding and the destination node embedding in accordance with current values of manifold neural network parameters to generate as output respective source node manifold coordinates and destination node manifold coordinates. The manifold coordinates generated by the manifold neural network generally have a smaller dimensionality than the node embeddings processed by the manifold neural network. That is, the manifold neural network implements a transformation $f_\theta$ such that:

$$f_\theta: \mathbb{R}^D \rightarrow \mathbb{R}^d$$

where D is the dimensionality of the node embeddings, d is the dimensionality of the manifold coordinates, and d<D.

The manifold neural network can be implemented as a fully-connected neural network, a convolutional neural network, or any other appropriate type of neural network. The system determines the parameter values of the manifold neural network by a training procedure, as described with reference to FIG. 3.

The system generates an edge score for the source node and the destination node by providing the source node manifold coordinates and the destination node manifold coordinates (e.g., as determined in 206) as inputs to an edge function (208). The edge function processes the source node manifold coordinates and the destination node manifold coordinates in accordance with current values of edge function parameters to generate as output the edge score for the source node and the destination node. The edge score is a numerical value indicating a likelihood that the entities represented by the source node and the destination node have a particular relationship.

In some implementations, the edge function may generate the edge score as an affine projection of the source node manifold coordinates and the destination node manifold coordinates. For example, the edge function may generate the edge score g(s,d) for the source node s and the destination node d by:

$$g(s,d)=f_\theta(Y_s)^T \times M \times f_\theta(Y_d) \qquad (1)$$

where $Y_s$ is the source node embedding, $Y_d$ is the destination node embedding, $f_\theta(\cdot)$ is the transformation implemented by the manifold neural network, $f_\theta(Y_s)^T$ is a transpose of the source node manifold coordinates, $f_\theta(Y_d)$ are the destination node manifold coordinates, x indicates a matrix multiplication operation, and M is an affine projection matrix. In this example, the projection matrix M may be defined as a low-rank projection matrix that is a product between a left projection matrix and a right projection matrix, that is:

$$M=L \times R \qquad (2)$$

where, for example, $M \in \mathbb{R}^{d \times d}$, $L \in \mathbb{R}^{d \times b}$, $R \in \mathbb{R}^{b \times d}$, and b<d. When the projection matrix M is defined as in (2), then the edge function can generate the edge score g(s, d) for the source node s and the destination node d by:

$$g(s,d)=\langle f_\theta(Y_s)^T \times L, R \times f_\theta(Y_d) \rangle \qquad (3)$$

where $\langle \cdot, \cdot \rangle$ is the inner product operation.

In some implementations, the edge function may generate the edge score as an inner product between: (i) a learned parameter vector, and (ii) a vector that includes, for each dimension of the parameter vector, a value of an activation function of a respective low-rank affine projection of the source node manifold coordinates and the destination node manifold coordinates. For example, the edge function may generate the edge score g(s, d) for the source node s and the destination node d by:

$$g(s,d)=\langle w,[\sigma(g_1(s,d)),\sigma(g_2(s,d)), \ldots ,\sigma(g_n(s,d))]\rangle \qquad (4)$$

where w is the parameter vector, $\sigma$ is the activation function (e.g., a rectified linear unit or sigmoid activation function), $\langle \cdot, \cdot \rangle$ is the inner product operation, and for each i=1, ... n, $g_i(s, d)$ is a respective low-rank affine projection of the source manifold coordinates and the destination manifold coordinates. Each respective low-rank projection $g_i(s, d)$ may be determined as described in, for example, (1) or (3), or in any other appropriate manner. The parameter values of each respective low-rank affine projection $g_i$ may be different (e.g., each respective low-rank affine projection $g_i$ may be defined by a different projection matrix $M_i$).

When the edges in the graph are directed edges, the edge function can be asymmetric with respect to the source node manifold coordinates and the destination node manifold coordinates. For example, if the edge function generates the edge score g(s, d) for source node s and destination node d in accordance with (1) or (3), then the edge score g(s, d) may not be equal to the edge score g(d, s). In this example, the edge score g(s, d) represents a likelihood that the entity represented by the source node has a particular relationship with the entity represented by the destination node. Analogously, the edge score g(d, s) represents a likelihood that the entity represented by the destination node has a particular relationship with the entity represented by the source node.

The system determines the parameter values of the edge function (e.g., the values of the components of the projection matrix M and the parameter vector w) by a training procedure, as described with reference to FIG. 3.

Figure 3:
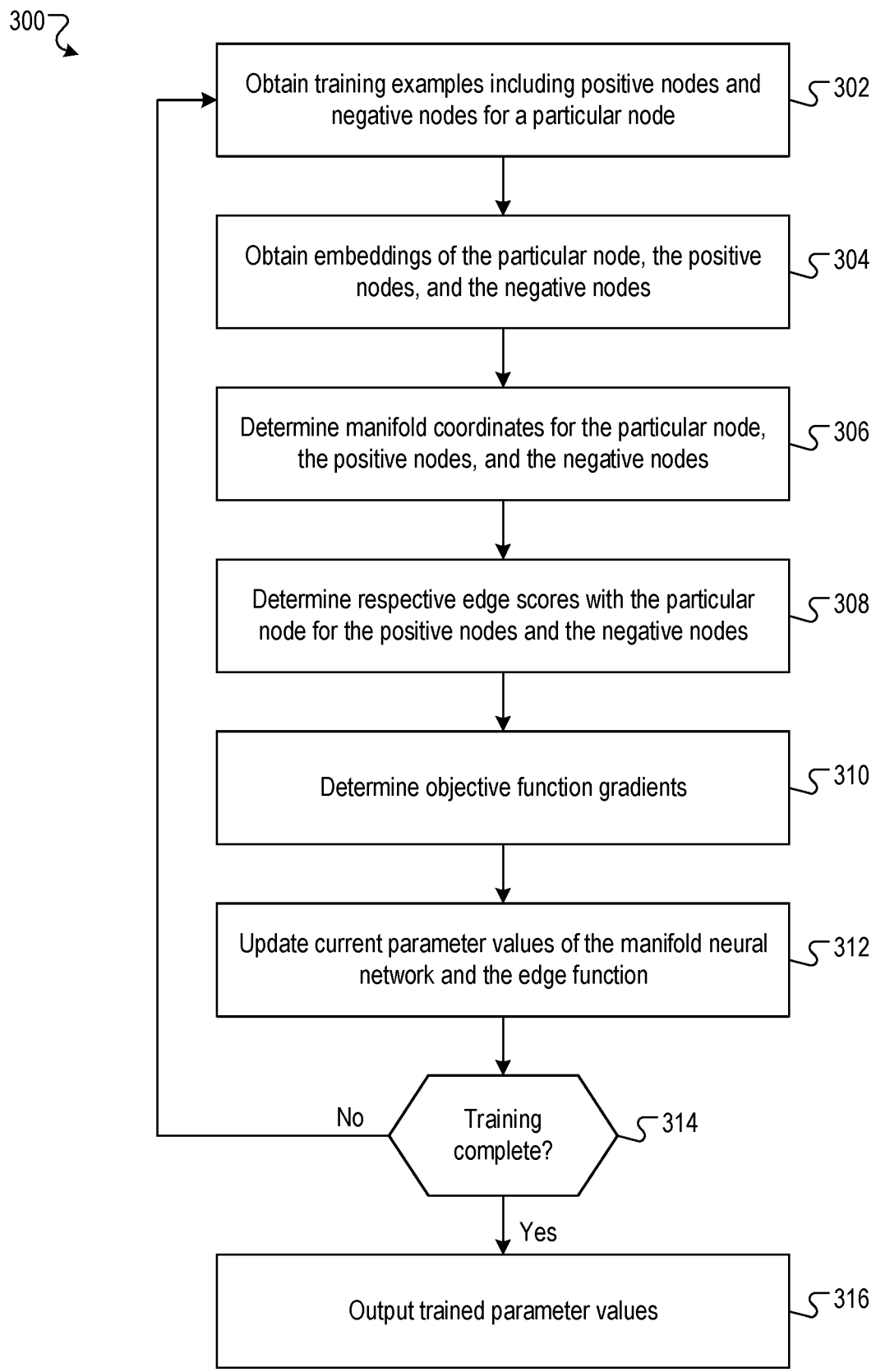
FIG. 3 is a flow diagram of an example process for training a graph processing system.

FIG. 3 is a flow diagram of an example process for training a graph processing system. For convenience, the process 300 will be described as being performed by a system of one or more computers located in one or more locations. For example, a graph processing system, e.g., the graph processing system 100 of FIG. 1, appropriately programmed in accordance with this specification, can perform the process 300.

The system obtains a batch of training examples (i.e., a set of multiple training examples), where each training example includes data identifying: (i) a particular node in the graph, (ii) one or more positive nodes in the graph for the particular node, and (iii) one or more negative nodes in the graph for the particular node (302).

In some implementations, a positive node for the particular node is defined as a node that is connected by an edge to the particular node in the graph. In some implementations, a positive node for the particular node is defined as a node that is within a context window of the particular node in a sequence of nodes generated by a random walk of the graph (e.g., a node that is within a small number of hops of the particular node in the graph). A sequence of nodes generated by a random walk of the graph refers to a sequence of nodes generated by, starting from a first node in the sequence (that may be, e.g., randomly selected), determining a next node in the sequence by randomly selecting a node that is connected by an edge to the current node in the sequence. A node is said to be within a context window of the particular node in a sequence of nodes generated by a random walk if they both appear in the sequence and their positions in the sequence are separated by fewer than a threshold number of positions. For example, if the nodes in the graph are indexed by natural numbers, the index of the particular node is 2, and a sequence of nodes generated by a random walk of the graph is given by: [1, 9, 7, 2, 18, 3, 5], then the node with index 1 is within a context window of size 3 of the particular node (since it appears within 3 positions of the particular node in the sequence).

A negative node for the particular node may be, for example, a node that is not connected by an edge to the particular node in the graph.

The system may obtain the batch of training examples by randomly sampling multiple training examples. An example process for randomly sampling a training example is described with reference to FIG. 4. In general, the system performs the steps 304-312 for each training example in the batch. For brevity, the description which follows (i.e., steps 304-312) is described with reference to a particular training example from the batch of training examples.

The system obtains embeddings of the particular node, the positive nodes, and the negative nodes (304). As described earlier, an embedding of a node is a numerical representation of the node in any appropriate format (e.g., as a vector or as a matrix). An example process for obtaining node embeddings is described above with reference to step 204. The embedding of a node is updated based on a gradient of an objective function, as described with reference to 310. In some cases, the embedding of a node is based at least in part on the attributes of the node. For example, the embedding of a node may be partitioned into two distinct subsets. The values of the components of one of the subsets may be determined by training (as described with reference to 312). The values of the components of the other subset may be determined to be the attributes of the node.

The system generates manifold coordinates of the particular node, the positive nodes, and the negative nodes by providing their respective node embeddings (i.e., as determined in 304) as inputs to the manifold neural network (306). The manifold neural network processes the node embedding of the particular node, the node embeddings of the positive nodes, and the node embeddings of the negative nodes in accordance with current values of manifold neural network parameters to generate as output respective manifold coordinates for the particular node, the positive nodes, and the negative nodes.

The system determines respective edge scores with the particular node for the positive nodes and the negative nodes (308). More specifically, for each positive node, the system generates an edge score with the particular node for the positive node by providing the particular node manifold coordinates and the positive node manifold coordinates as input to the edge function. The edge function processes the particular node manifold coordinates and the positive node manifold coordinates in accordance with current values of edge function parameters to generate as output the edge score with the particular node for the positive node. Similarly, for each negative node, the system generates an edge score with the particular node for the negative node. An example process for generating an edge score by applying the edge function to a pair of manifold coordinates is described above with reference to step 208.

The system determines gradients of an objective function that promotes generating high edge scores with the particular node for the positive nodes and penalizes generating high edge scores with the particular node for the negative nodes (310). The system determines the gradients (e.g., by a backpropagation procedure) with respect to parameters of the manifold neural network and the edge function. In some cases, the system further determines the gradients with respect to the parameters of one or more of: (i) the embedding of the particular node, (ii) the embeddings of the positive nodes, and (iii) the embeddings of the negative nodes.

For example, the training examples may include a particular node u, one positive node p, and N negative nodes $\{n_i\}_{j=1}^{N}$, and the objective function $\mathcal{L}$ may be given by:

$$\mathcal{L} = \log \sigma(g(u, p)) + \sum_{j=1}^{N} \log(1 - \sigma(g(u, n_j))) \qquad (5)$$

where $\sigma$ is an activation function (e.g., a rectified linear unit or sigmoid activation function), g (u, p) is the edge score with the particular node u for the positive node p, and for j=1, . . . , N, g(u, $n_j$) is the edge score with the particular node u for negative node $n_j$. Other objective functions are possible. For example, the objective function in (5) is a linear approximation to an objective function given by:

$$\mathcal{L} = \prod_{u,v \in V} \sigma(g(u, v))^{\mathcal{D}_{u,v}} \cdot \left(1 - \sigma(g(u, v))\right)^{\mathbb{I}[(u,v) \notin E]} \qquad (6)$$

where the product is over the set of nodes V in the graph, $\sigma$ is an activation function, g(u, v) is the edge score for nodes u and v, $D_{u,v}$ is a frequency with which the node pair (u, v) appears in a list of node pairs that are within a context window of one another in a sequence of nodes generated by a random walk of the graph (as described with reference to 404), and $\mathbb{I}[(u, v) \notin E]$ is an indicator function that takes value 1 if the graph does not have an edge from u to v, and takes value 0 otherwise.

The system uses the gradients (e.g., as determined in 310) to update the current parameter values of the manifold neural network and the edge function (312). In some cases, the system also uses the gradients to update the current parameter values of one or more of: (i) the embedding of the particular node, (ii) the embeddings of the positive nodes, and (iii) the embeddings of the negative nodes. For a given parameter $\theta$, the system may update the current value of the parameter by:

$$\theta \leftarrow \theta - r \cdot \nabla_\theta \mathcal{L} \qquad (7)$$

where r is a positive learning rate parameter (i.e., a system hyper-parameter governing how quickly parameter values can change during training) and $\nabla_\theta \mathcal{L}$ is the gradient with respect to the parameter θ (e.g., as determined in 310).

The system determines if the training is complete (314). In some implementations, the system determines the training is complete if a predetermined number of training iterations (i.e., repetitions of 302-312) have been completed. In some implementations, the system determines the training is complete when a difference in the value of the objective function between iterations falls below a predetermined threshold.

In response to determining that the training is not complete, the system returns to 302 and repeats the preceding steps. Thus, the system repeatedly trains the neural network on different batches of training examples. In response to determining that the training is complete, the system outputs the system outputs the trained parameter values (e.g., of the manifold neural network and the edge function) (316).

Figure 4:
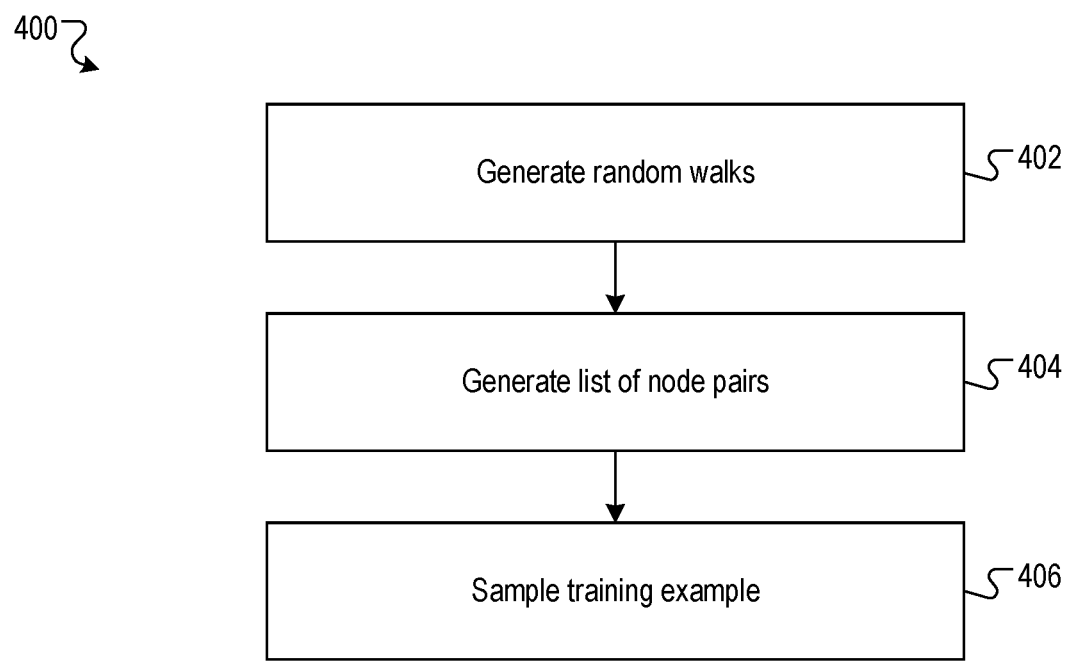
FIG. 4 is a flow diagram of an example process for randomly sampling a training example.

FIG. 4 is a flow diagram of an example process for sampling a training example. For convenience, the process 400 will be described as being performed by a system of one or more computers located in one or more locations. For example, a graph processing system, e.g., the graph processing system 100 of FIG. 1, appropriately programmed in accordance with this specification, can perform the process 400.

The system generates a predetermined number of random walks in the graph (402). Each random walk is defined by a sequence of a predetermined number of nodes in the graph. To generate a random walk, the system determines a first node in the sequence (e.g., by randomly sampling a node in the graph), and then iteratively determines each subsequent node in the sequence by randomly selecting a node that is connected by an edge to the current node in the sequence.

The system generates a list of node pairs from the random walks (404). Specifically, for each random walk, the system traverses the sequence of nodes in the random walk, and for each node u, the system adds node pairs (u, v) to the list of node pairs whenever node v appears within a predetermined number of positions (referred to as a context window) of the node u. In general, the list may contain duplicate node pairs (i.e., particular node pairs may appear more than once in the list).

The system samples a training example (406). The training example includes a particular node, a positive node (i.e., with respect to the particular node), and multiple negative nodes (i.e., with respect to the particular node). To sample the training example, the system randomly samples a node pair (u, v) from the list of node pairs, and designates the node u as the particular node included in the training example and the node v as the positive node included in the training example. The system determines the negative nodes included in the training example by randomly sampling a predetermined number of nodes in the graph that are not connected by an edge to the particular node included in the training example.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a manifold neural network and a learned edge function to determine trained values of parameters of the manifold neural network and the learned edge function, wherein:

the manifold neural network is a deep neural network that is configured to receive input numeric embeddings representing input nodes in a graph and to process each input numeric embedding to generate manifold coordinates of the input node represented by the input numeric embedding, and the learned edge function is configured to receive manifold coordinates of a first node in the graph and manifold coordinates of a second node in the graph and to process the manifold coordinates of the first node and the manifold coordinates of the second node to generate an edge score that represents a likelihood that an entity represented by the first node and an entity represented by the second node have a particular relationship, the method comprising:

performing a plurality of random walks on the graph, wherein each random walk defines a sequence of nodes from the graph;

generating a set of positive training examples based on the random walks on the graph, wherein each positive training example comprises a reference node and a positive node, wherein the reference node and the positive node are within a context window in a random walk on the graph;

obtaining: (i) a positive training example from the set of positive training examples, wherein the positive training example comprises a reference node and a positive node that are separated by at least one intervening node in a random walk on the graph, and (ii) one or more negative nodes corresponding to the reference node;

determining, using the manifold neural network and in accordance with current values of parameters of the manifold neural network, respective manifold coordinates of the reference node, the positive node, and the negative nodes;

determining, using the learned edge function and in accordance with current values of parameters of the learned edge function, a respective edge score with the reference node for the positive node and each of the negative nodes from the respective manifold coordinates;

determining gradients of an objective function that promotes generating a high edge score for the positive node and penalizes generating high edge scores for the negative nodes with respect to the parameters of the manifold neural network and the parameters of the learned edge function; and using the gradients to update the current values of the parameters of the manifold neural network and of the parameters of the learned edge function.

2. The method of claim 1, further comprising:

determining a gradient of the objective function with respect to a current numeric embedding of the reference node; and updating the current numeric embedding of the reference node using the gradient.

3. The method of claim 1, further comprising:

determining gradients of the objective function with respect to a current numeric embedding of the positive node; and updating the current numeric embedding of the positive node using the gradients.

4. The method of claim 1, wherein each negative node is a node that is not connected by an edge to the reference node in the graph.

5. The method of claim 1, wherein the particular relationship is an asymmetric relationship, wherein edges in the graph are directed edges, and wherein the learned edge function is an asymmetric edge function.

6. The method of claim 5, wherein the edge score represents a likelihood that the entity represented by the first node has the particular relationship to the entity represented by the second node regardless of whether the entity represented by the second node has the particular relationship to the entity represented by the first node.

7. The method of claim 1, wherein a dimensionality of the manifold coordinates is smaller than a dimensionality of the numeric embeddings.

8. The method of claim 1, wherein the learned edge function is a learned affine projection of the manifold coordinates for the first node and second node.

9. The method of claim 1, wherein the learned edge function is an inner product of (i) a matrix multiplication between a learned left projection matrix and a transpose of the manifold coordinates of the first node and (ii) a matrix multiplication between a learned right projection matrix and the manifold coordinates of the second node.

10. The method of claim 1, wherein the learned edge function is an inner product between (i) a learned parameter vector and (ii) a vector that includes, for each dimension of the learned parameter vector, a value of an activation function of a respective learned affine projection for the dimension.

11. A system comprising:

one or more computers; and one or more storage devices communicatively coupled to the one or more computers, wherein the one or more storage devices store instructions that, when executed by the one or more computers, cause the one or more computers to perform operations for training a manifold neural network and a learned edge function to determine trained values of parameters of the manifold neural network and the learned edge function, wherein:

the manifold neural network is a deep neural network that is configured to receive input numeric embeddings representing input nodes in a graph and to process each input numeric embedding to generate manifold coordinates of the input node represented by the input numeric embedding, and the learned edge function is configured to receive manifold coordinates of a first node in the graph and manifold coordinates of a second node in the graph and to process the manifold coordinates of the first node and the manifold coordinates of the second node to generate an edge score that represents a likelihood that an entity represented by the first node and an entity represented by the second node have a particular relationship, the operations comprising:

performing a plurality of random walks on the graph, wherein each random walk defines a sequence of nodes from the graph;

generating a set of positive training examples based on the random walks on the graph, wherein each positive training example comprises a reference node and a positive node, wherein the reference node and the positive node are within a context window in a random walk on the graph;

obtaining: (i) a positive training example from the set of positive training examples, wherein the positive training example comprises a reference node and a positive node that are separated by at least one intervening node in a random walk on the graph, and (ii) one or more negative nodes corresponding to the reference node;

determining, using the manifold neural network and in accordance with current values of parameters of the manifold neural network, respective manifold coordinates of the reference node, the positive node, and the negative nodes;

determining, using the learned edge function and in accordance with current values of parameters of the learned edge function, a respective edge score with the reference node for the positive node and each of the negative nodes from the respective manifold coordinates;

determining gradients of an objective function that promotes generating a high edge score for the positive node and penalizes generating high edge scores for the negative nodes with respect to the parameters of the manifold neural network and the parameters of the learned edge function; and using the gradients to update the current values of the parameters of the manifold neural network and of the parameters of the learned edge function.

12. The system of claim 11, wherein the operations further comprise:
   determining a gradient of the objective function with respect to a current numeric embedding of the reference node; and
   updating the current numeric embedding of the reference node using the gradient.

13. The system of claim 11, wherein the operations further comprise:
   determining gradients of the objective function with respect to a current numeric embedding of the positive node; and
   updating the current numeric embedding of the positive node using the gradients.

14. The system of claim 11, wherein each negative node is a node that is not connected by an edge to the reference node in the graph.

15. The system of claim 11, wherein the particular relationship is an asymmetric relationship, wherein edges in the graph are directed edges, and wherein the learned edge function is an asymmetric edge function.

16. One or more non-transitory computer storage media storing instructions that when executed by one or more computers cause the one or more computers to perform operations for training a manifold neural network and a learned edge function to determine trained values of parameters of the manifold neural network and the learned edge function, wherein:
   the manifold neural network is a deep neural network that is configured to receive input numeric embeddings representing input nodes in a graph and to process each input numeric embedding to generate manifold coordinates of the input node represented by the input numeric embedding, and
   the learned edge function is configured to receive manifold coordinates of a first node in the graph and manifold coordinates of a second node in the graph and to process the manifold coordinates of the first node and the manifold coordinates of the second node to generate an edge score that represents a likelihood that an entity represented by the first node and an entity represented by the second node have a particular relationship, the operations comprising:
   performing a plurality of random walks on the graph, wherein each random walk defines a sequence of nodes from the graph;
   generating a set of positive training examples based on the random walks on the graph, wherein each positive training example comprises a reference node and a positive node, wherein the reference node and the positive node are within a context window in a random walk on the graph;
   obtaining: (i) a positive training example from the set of positive training examples, wherein the positive training example comprises a reference node and a positive node that are separated by at least one intervening node in a random walk on the graph, and (ii) one or more negative nodes corresponding to the reference node;
   determining, using the manifold neural network and in accordance with current values of parameters of the manifold neural network, respective manifold coordinates of the reference node, the positive node, and the negative nodes;
   determining, using the learned edge function and in accordance with current values of parameters of the learned edge function, a respective edge score with the reference node for the positive node and each of the negative nodes from the respective manifold coordinates;
   determining gradients of an objective function that promotes generating a high edge score for the positive node and penalizes generating high edge scores for the negative nodes with respect to the parameters of the manifold neural network and the parameters of the learned edge function; and
   using the gradients to update the current values of the parameters of the manifold neural network and of the parameters of the learned edge function.

17. The non-transitory computer storage media of claim 16, further comprising:
   determining a gradient of the objective function with respect to a current numeric embedding of the reference node; and
   updating the current numeric embedding of the reference node using the gradient.

18. The non-transitory computer storage media of claim 16, further comprising:
   determining gradients of the objective function with respect to a current numeric embedding of the positive node; and
   updating the current numeric embedding of the positive node using the gradients.

19. The non-transitory computer storage media of claim 16, wherein each negative node is a node that is not connected by an edge to the reference node in the graph.

20. The non-transitory computer storage media of claim 16, wherein the particular relationship is an asymmetric relationship, wherein edges in the graph are directed edges, and wherein the learned edge function is an asymmetric edge function.

* * * * *

UNITED STATES PATENT AND TRADEMARK OFFICE
CERTIFICATE OF CORRECTION

| | |
|---|---|
| PATENT NO. | : 11,455,512 B1 |
| APPLICATION NO. | : 15/946301 |
| DATED | : September 27, 2022 |
| INVENTOR(S) | : Al-rfou' et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this
Fifth Day of September, 2023

*Katherine Kelly Vidal*

Katherine Kelly Vidal
*Director of the United States Patent and Trademark Office*